United States Patent
Bestmann

[11] Patent Number: 5,835,244
[45] Date of Patent: Nov. 10, 1998

[54] METHOD AND APPARATUS FOR THE CONVERSION OF COLOR VALUES

[75] Inventor: Günter Bestmann, Altenholz, Germany

[73] Assignee: Linotype-Hell AG, Kiel, Germany

[21] Appl. No.: 624,529

[22] PCT Filed: Oct. 7, 1996

[86] PCT No.: PCT/DE94/01182

§ 371 Date: Sep. 4, 1996

§ 102(e) Date: Sep. 4, 1996

[87] PCT Pub. No.: WO95/10914

PCT Pub. Date: Apr. 20, 1995

[30] Foreign Application Priority Data

Oct. 15, 1993 [DE] Germany .......................... 43 35 143.3

[51] Int. Cl.$^6$ ...................................................... G03F 3/08
[52] U.S. Cl. ........................ 358/523; 358/515; 358/518; 382/167
[58] Field of Search ................................... 358/520, 515, 358/518, 521, 523, 524, 525, 522, 501, 516, 529, 504, 296; 382/162, 167

[56] References Cited

U.S. PATENT DOCUMENTS

| | | | |
|---|---|---|---|
| 4,959,669 | 9/1990 | Haneda et al. | 340/157 |
| 5,196,927 | 3/1993 | Warner | 358/500 |
| 5,333,069 | 7/1994 | Spence | 358/517 |
| 5,416,613 | 5/1995 | Rolleston et al. | 358/518 |
| 5,420,704 | 5/1995 | Winkelman | 358/520 |
| 5,481,380 | 1/1996 | Bestmann | 358/504 |
| 5,493,321 | 2/1996 | Zwadlo | 347/131 |
| 5,668,890 | 9/1997 | Winkelman | 382/167 |

FOREIGN PATENT DOCUMENTS

| | | |
|---|---|---|
| 0 144 188 | 6/1985 | European Pat. Off. |
| 43 05 693 A1 | 10/1993 | Germany. |
| WO 94/08274 | 4/1994 | WIPO. |

*Primary Examiner*—Edward L. Coles
*Assistant Examiner*—Madeleine A. V. Nguyen
*Attorney, Agent, or Firm*—Hill & Simpson

[57] ABSTRACT

A method and an apparatus for the conversion of color values of a first color space into color separation values of a printing color space characteristic of a printing process in apparatus and systems for color image processing. For the purpose of exact adaptation of the color separation values [C, M, Y, K] of the printing color space to the respective printing process, the functionally allocated color separation values [C, M, Y, K] are first approximately analytically calculated from the color values [L*, a*, b*] of the first color space as a printing table [C, M, Y, K=f(L*, a*, b*)], taking the printing colors of the respective printing color space of the later printing process, the colorimetric properties of the printing material employed later, and the printing process parameters into consideration. Subsequently, the calculated printing table [C, M, Y, K=f(L*, a*, b*)] is corrected by a color value calibration correction values [dL*, da*, db*] are calculated by comparison of the color values [L*(v), a*(v), b*(v)] of the first color space characteristic of the colors of a test table to the colorimetrically measured color values [L*(m), a*(m), b*(m)] of the corresponding colors of the test table produced as a proof, and the table values of the printing table [C, M, Y, K=f(L*, a*, b)] are corrected by the correction values [dL*, da*, db*].

33 Claims, 5 Drawing Sheets

Fig. 2

Calculation of a Print Table

Fig. 3
Calibration of a Print Table

Fig. 5

METHOD AND APPARATUS FOR THE CONVERSION OF COLOR VALUES

BACKGROUND OF THE INVENTION

The invention is in the field of electronic reproduction technology and is directed to a method and to an apparatus for the conversion of color values, for the purpose of adaptation to a printing process given devices and systems for image processing.

Reproduction technology is concerned with methods for reproducing image originals in printing, wherein a copy master is produced from an original as a basis for a printing form. The reproduction of the original occurs in a printing press with the printing form.

The manufacture of the copy master generally occurs in the steps of image input, input processing and image output.

In the image input with, for example, a color image scanner (scanner) as input device, three primary color value signals R, G and B are acquired by trichromatic as well as pixel-by-pixel and line-by-line optoelectronic scanning of a color original to be reproduced, whereby the individual color value triads represent the color constituents "Red" (R), "Green" (G) and "Blue" (B) of the pixels scanned in the color original. The analog color value signals are converted into digital color values and are stored for the subsequent image processing.

In the image processing, the color values R, G and B are first converted into color separation values C, M, Y and K by a basic color correction according to the laws of subtractive color mixing, these color separation values being a measure for the dosage or, respectively, for the raster point sizes of the inks "Cyan" (C), "Magenta" (M), "Yellow" (Y) and "Black" (K) employed in the later printing process. Beyond this, further color corrections are implemented in the image processing with the object of improving the image reproduction, compensating deficiencies or undertaking editorial changes.

After the image processing, the image output occurs with a suitable output device, for example with a color separation exposer (recorder) for the rastered recording of the color separations "cyan", "magenta", "yellow" and "black" on a film.

The demand is often raised to be able to connect various input and output devices to a color image processing system. For that purpose, the introduction of a defined standard for the color values at the interface between image input and color image processing and at the interface between color image processing and image output is of great advantage. For that purpose, the color values R, G and B generated in the input device must be transformed onto the respective, internal standard of the color image processing system, for example into the color values L*, a* and b* of the CIELAB color space, must be processed and the standardized and corrected values L*, a* and b* must then be converted into the color separation values C, M, Y and K for the exposure of the color separations in the form of a conversion table, referred to below as a printing table.

The literature, for example, the periodical "Der Druckspiegel", No. 6, 1991, pp. 580–592, the article "Farbe in der Bildverarbeitung" already discloses that the color values of a device-dependent input color space acquired in a color image scanner be transformed for a universal color presentation into color values of a device-independent communication color space on the basis of a color space transformation, that the corresponding corrections be undertaken on the basis of the transformed color values, and that the corrected color values then be converted by a further color transformation into the corresponding process color values of a device-dependent output color space.

EP-A-0 528 094 already discloses a method for calculating a printing table. Therein, a measuring of the corresponding color values as well as a subsequent interpolation occur for calculating intermediate values. As a result of the expense incurred, relatively few supporting values are identified and interpolation is carried out between these supporting values. Due to the small number of supporting values, only a limited precision can be achieved. A further possibility for calculating a printing table for image reproduction devices is disclosed by DE-A-40 12 905.

The determination of a printing table needed for the printing process by conversion of the color values R, G and B into the color separation values C, M, Y and K have previously been experimentally determined in practice by visual comparison between color original and the printed result. An adaptation of the printing table to other printing processes is often difficult and time-consuming. Further disadvantages of this procedure are the dependency on inks and on the printing process, the unsurveyable presentation of the color values with surface coverage values (raster percentage values), the necessity of highly qualified operating personnel, and the difficulty of communicating about colors.

SUMMARY OF THE INVENTION

It is the object of the invention to specify a method and an apparatus for the conversion of color values for the purpose of adaptation to a printing process with which printing tables can be produced with high precision for achieving a high reproduction quality.

According to a method of the invention for conversion of color values of a first color space into color values of a second color space as a printing color space characteristic of a printing process in apparatus and systems for color image processing, first corresponding color separation values of the printing color space for the respective printing process are approximately analytically calculated from color values of the first color space to form an approximated printing table, taking printing colors of the printing color space for the printing process employed, calorimetric properties of a printing material used in the printing process, and printing process parameters into consideration. Using the approximated printing table, corresponding color separation values are calculated from characteristic color values of a color test table as a data source. A proof of the color test table is then produced with the calculated color separation values and the proof is then colorimetrically measured, taking the printing press as parameters for the later printing into consideration. Color difference values are then calculated between color values acquired by the colorimetric measurement of the proof (actual values) and the characteristic color values of the test color table (rated color values). These color difference values are then used as correction color values to create corrected color values by a combination of the correction color values with the color values of the color test table. These corrected color values then become input color values for the approximated printing table so that table values of the printing table are corrected so that the printing table can be utilized to convert color values of the first color space into color values of the second color space for a substantially exact adaption to the respective printing process.

The invention is described in greater detail below with reference to FIGS. 1–5.

DESCRIPTION OF THE PREFERRED EMBODIMENTS

Figure 1:
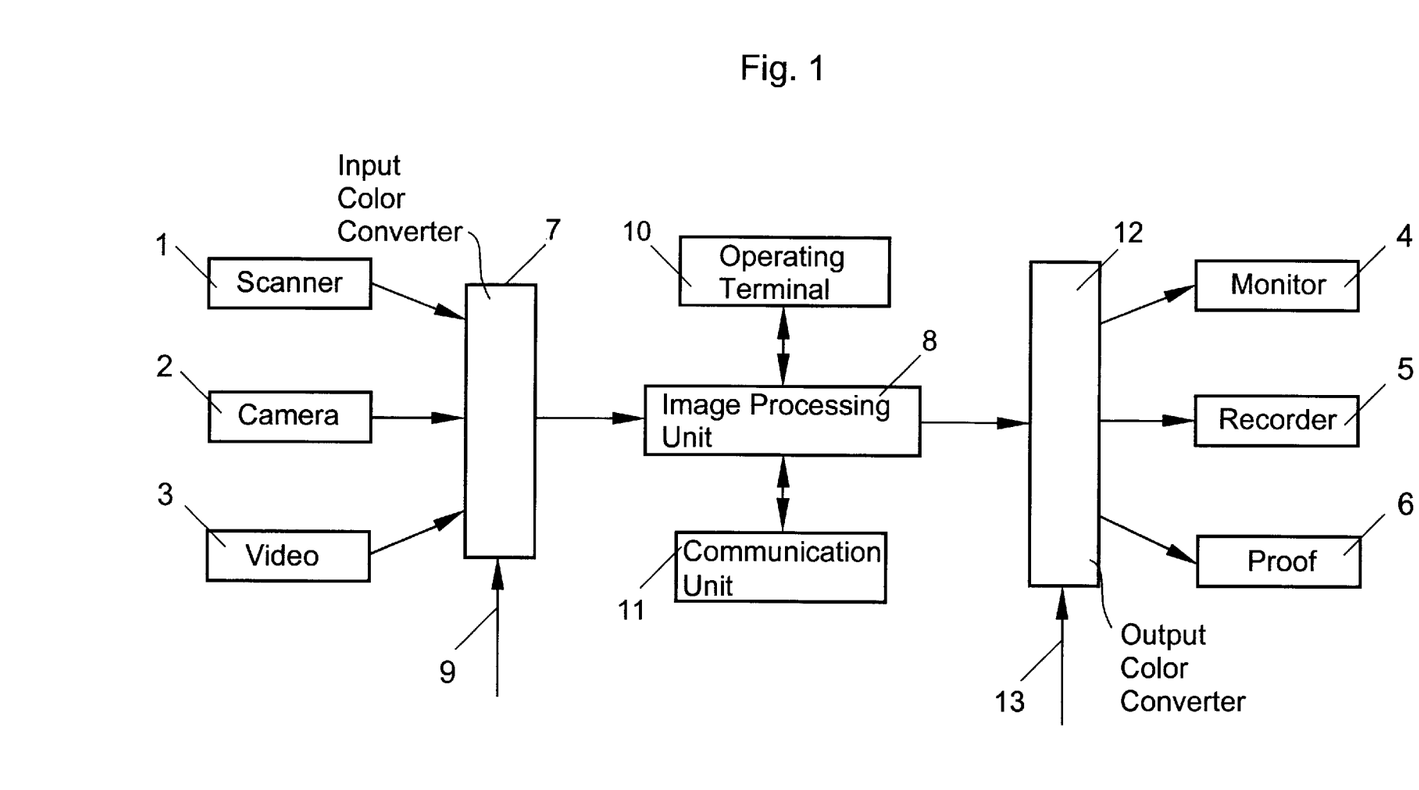
FIG. 1 illustrates an image processing system in a block circuit diagram.

FIG. 1 shows the schematic structure and the signal flow of a color image processing system in a block circuit diagram. Input devices that scan point-by-point and line-by-line are represented by a scanner (1); devices that scan surface-wise are represented by a camera (2); and devices for generating chromatic, graphic data such as, for example, graphic design stations are represented by a graphics input (3). The possible output devices are indicated by a color monitor (4), a color separation recorder or exposer (5) as well as by a proof recorder (6). The color values of the respective device-dependent input color space generated in the input devices (1, 2, 3), for example the color values R, G and B of the RGB color space, are converted by an input color transformation in a three-dimensional input color converter (7) into color values of a device-independent communication color space, for example into the color values L*, a* and b* of the CIELAB color space of the CIE of 1976, and are supplied to an image processing unit (8).

The three-dimensional input color converter (7) is designed as a table memory (LUT) for an input-side conversion table in which the color values L*, a* and b* are stored in addressable fashion by functionally corresponding color values R, G and B.

The color corrections and the geometrical processings desired by the user are implemented in the image processing unit (8) on the basis of the transformed color values L*, a* and b* of the communication color space. For that purpose image processing unit (8) is connected to an operating terminal (10) with which the user implements the desired color corrections. The image processing unit (8) is also in communication with a communication unit (11) in which the color values to be processed are intermediately stored.

After the image processing, the corrected color values L*, a* and b* are read out from the image processing unit (8) and, in a likewise three-dimensional output color converter (12) are converted into the process color values of a device-specific output color space on the basis of an output color transformation, these being respectively supplied to the output device (4, 5, 6).

The three-dimensional output color converter (12) is likewise designed as a table memory (LUT) for an output-side color conversion table in which the process color values are stored addressable by the functionally corresponding color values L*, a* and b*.

The color conversion tables are calculated before the image processing and are correspondingly loaded via an input (9) into the input color converter (7) or, respectively, via an input (13) into the output color converter (12).

The color conversion tables can be respectively calculated for all theoretically possible color values of the color space or, on the other hand, can be advantageously calculated at first only for a framework of supporting points of roughly graduated color values, whereby all color values actually required for the color transformations are calculated by a three-dimensional interpolation calculation on the basis of the framework of supporting points. In this case, the color converters additionally comprise interpolation units.

As shown in FIG. 1, the color converters (7, 12) are separate units or are a component part of an input device (1, 2, 3) or, respectively, of an output device (4, 5, 6) or, on the other hand, component parts of the image processing unit (8).

Figure 2:
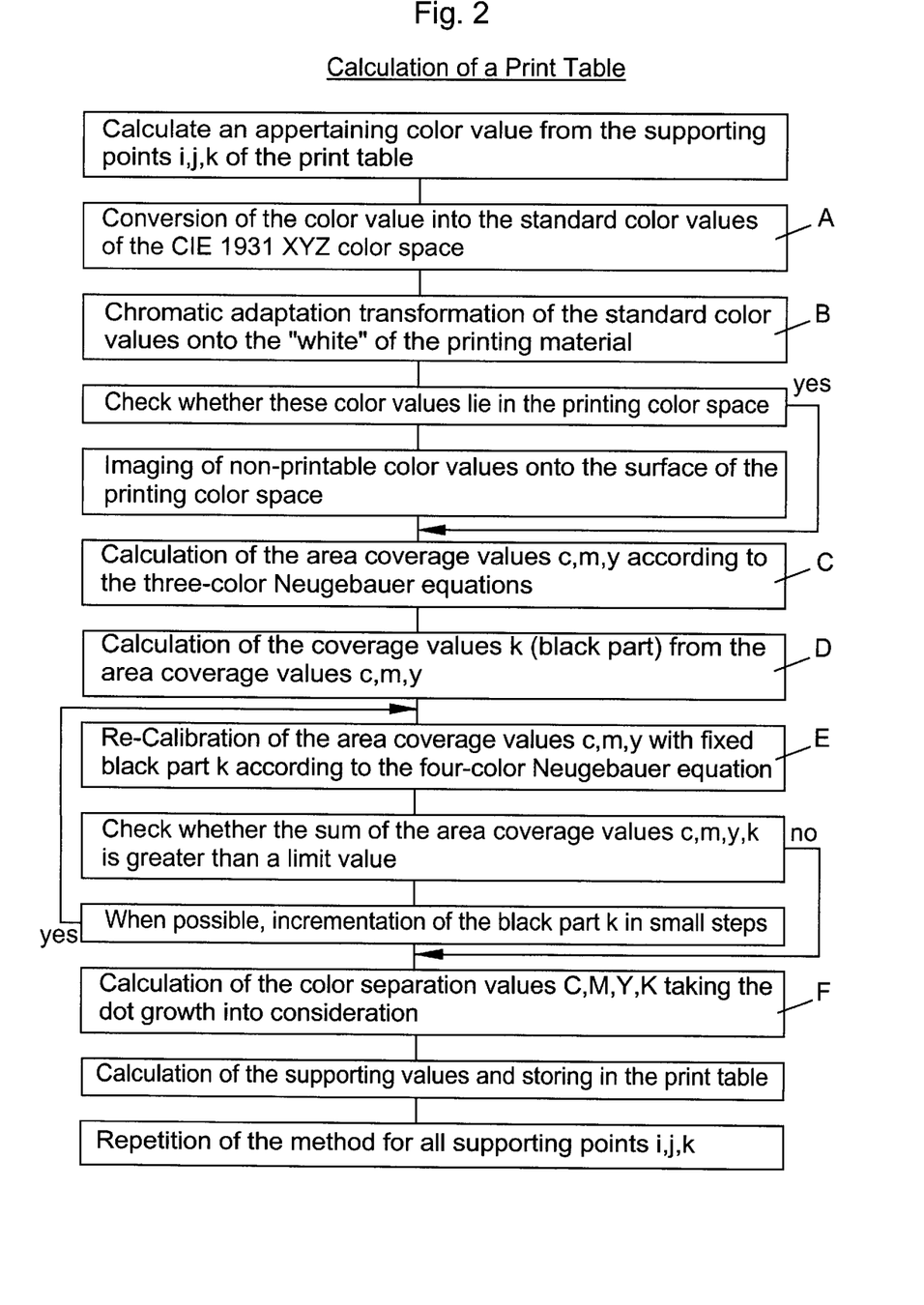
FIG. 2 illustrates a flowchart for calculating a printing table.

The method for calculating an output-side color conversion table (printing table) for the output color conversion of the color values of a standardized communication color space corrected in an image processing unit into the color separation values C, M, Y and K of a specific printing color space is the subject matter of the present patent application and as explained in greater detail below with reference to the flowcharts shown in FIGS. 2 and 3. In this case, a printing table having the form:

$$C, M, Y, K = f(L^*, a^*, b^*)$$

is loaded in the table memory (LUT) of the output color converter (12).

In the described example, the color values L*, a* and b* of the CIELAB color space of the CIE from 1976 is converted as standardized communication color space into the color separation values C, M, Y and K. However, the CIELUV, the YCC or some other standardized color space can also be employed as standardized communication color space.

In the method of the invention, the color separation values C, M, Y and K for the exposure of the color separations are first approximately analytically calculated from the printing colors (corner colors and intermediate colors of the printing color space) and the printing process values such as the dot growth, are calculated dependent on the color values L*, a* and b* of the standardized communication color space as printing table C, M, Y, K=f(L*, a*, b*). The exact matching of the approximately calculated color separation values C, M, Y and K of the printing table to the printing process subsequently occurs on the basis of a color value calibration in that correction values are calculated and the color separation values C, M, Y and K are correspondingly corrected.

Approximate Calculation of the Color Separation Values C. M. Y and K of the Printing Table A prerequisite for the approximately analytical calculation of the color separation values C, M, Y and K is the knowledge of a few parameters, namely of the standard color values X, Y and Z of the four printing colors cyan, magenta, yellow and black and their combined printing, the standardized color values $X_p$, $Y_p$ and $Z_p$ of the printing material for the later printing process, the functional relationship for the calculation of the color separation values K for "black," as well as the printing gradation (dot growth). The surface coverage sum of the four printing colors can also be considered as a further parameter.

The calculation of the color separation values C, M, Y and K can occur for all theoretically possible color values L*, a* and b* of the CIELAB color space or, on the other hand, as described in the following sample, can at first advantageously occur only for a framework of supporting points of roughly graduated color values, whereby all color values actually required for the later color transformation are calculated by a three-dimensional interpolation calculation on the basis of the framework of supporting points. In this case, the output color converter (12) additionally comprises an interpolation unit.

The calculation of the color separation values C, M, Y and K for each color location or supporting point (i, j, k) of the CIELAB color space occurs according to the flowchart of FIG. 2, occuring in the following method steps [A] through [F]:

In a method step [A], the color values L*, a* and b* of the CIELAB color space are first transformed into the standardized color values X, Y and Z of the CIE 1931 SYZ color space according to the equation:

$$X, Y, Z = f(L^*, a^*, b^*).$$

In detail, this transformation sequences according to the following equations:

$$f(X/X_n) = a^*/500 + f(Y/Y_n)$$

$$f(Y/Y_n) = (L^* + 16)/116$$

$$f(Z/Z_n) = f(Y/Y_n) - b^*/200$$

following therefrom:

$$\begin{aligned} X/X_n &= [f(X/X_n)]^3 & X/X_n &\geq (0.008856)^3 \\ & [f(X/X_n) - 16/116]/7.787 & X/X_n &< (0.008856)^3 \\ Y/Y_n &= [f(Y/Y_n)]^3 & Y/Y_n &\geq (0.008856)^3 \\ & [f(Y/Y_n) - 16/116]/7.787 & Y/Y_n &< (0.008856)^3 \\ Z/Z_n &= [f(Z/Z_n)]^3 & Z/Z_n &\geq (0.008856)^3 \\ & [f(Z/Z_n) - 16/116]/7.787 & Z/Z_n &< (0.008856)^3 \end{aligned}$$

In the equations, $X_n$, $Y_n$ and $Z_n$ are the standardized color values for a specific type of light, for example for light type D65.

In a following method step [B], the standardized color values X, Y and Z determined in method step [A] are recalculated to the "white" of the printing material employed in the later printing process, being recalculated with a change of chromatic adaptation transformation, for example with the "von Kries" transformation, being converted into chromatically adapted standardized color values X', Y' and Z' according to the equation:

$$X', Y', Z' = f(X, Y, Z).$$

The "von Kries" transformation is described, for example, in R.W.G. Hunt, Measuring Color, Ellis Horwood Limited, Chichester, England (1989).

The chromatic adaptation transformation of "von Kries" describes a change from a given light type that is defined by the standardized color values X, Y and Z into the light type E of the isoenergy spectrum. By inverting the transformation matrix, a chromatic adaptation can occur from the light type E into a different light type. Combinations of the transformations then lead to arbitrary chromatic adaptations. The standardized color values of reference white of the CIELAB color space and of the "white" of the printing material must be known for the chromatic adaptation transformation.

The chromatic adaptation transformation, for example into the light type E, sequences according to the following equation: calculation of the color type coefficient of the reference white $$x = X/(X+Y+Z)$$

$$y = Y/(X+Y+Z)$$

calculation of the matrixing coefficient $$b_{11} = y/(0.101 - 0.561^*x + 1.258^*y)$$

$$b_{33} = y/(1.0 - x - y)$$

$$b_{12} = 2.9543^*(1.0 - b_{11})$$

$$b_{13} = 0.2196^*(b_{33} - b_{11})$$

chromatic adaptation transformation $$\begin{bmatrix} X \\ Y \\ Z \end{bmatrix}_E = \begin{bmatrix} b_{11} & b_{12} & b_{13} \\ 0.0 & 1.0 & 0.0 \\ 0.0 & 0.0 & b_{33} \end{bmatrix} * \begin{bmatrix} X \\ Y \\ Z \end{bmatrix}_L$$

After the chromatic adaptation transformation, a check is expediently carried out to see whether the chromatically adapted standardized color values X', Y' and Z' lie in the printing color space, to which end the standardized color values of the printing colors and their superimposed printings must be known. When the check shows that the chromatically adapted standardized color values X', Y' and Z' lie in the printing color space, a switch is made to method step [C]; otherwise, an imaging of non-printable color values occurs onto the surface of the printing color space upon preservation of the respective color shade as well as given simultaneous compression of brightness and variegation.

In three-color printing, the colors of the printing color space arise by juxtaposed printing and partial superimposed printing of raster points with the printing colors "cyan", "magenta" and "yellow". The primary colors "cyan", "magenta" and "yellow" arise by juxtapose printing of raster points of the printing colors; the secondary colors "red", "green" and "blue" arise by partial superimposed printing of raster points with two printing colors; "black" arises by superimposed printing of raster points of all three printing colors; and "white" arises when no raster points are printed. All colors are defined by standardized color values X, Y and Z.

The Neugebauer equations describe the standardized color values X, Y and Z to be expected in rastered printing for the printed colors as a function of the surface coverage values c, m and y. The standardized color values X, Y and Z of an intermediate color of the printing color space thereby result by addition of the standardized color values X, Y and Z of the corner colors, whereby the standardized color values of the corner colors X, Y and Z are effective corresponding to the probable or statistical, relative surface parts α of the corner colors.

The Neugebauer equations are recited, for example, in H. E. J. Neugebauer, "Theorie des Vierfarbenbuchdrucks mit einem Schwarzdruck", Zeitschrift für wissenschaftliche Photografie, Photophysik and Photochemie, Vol. 36, No. 8/9(1937) as well as in I. Pobboravsky and M. Pearson, "Computation of Dot Areas Required to Match a Colorimetrically Specific Color Using the Modified Neugebauer Equations", Proceedings of Tech. Meeting of TAGA (1972), pp. 65–77.

The standardized color values X, Y and Z of printing colors in superimposed printing derive according to the following equations:

$$X = \alpha_p *X_p + \alpha_y *X_y + \alpha_m *X_m + \alpha_c *X_c +$$
$$\alpha_k *X_k + \alpha_b *X_b + \alpha_g *X_g + \alpha_r *Xr$$
$$Y = \alpha_p *Y_p + \alpha_y *Y_y + \alpha_m *Y_m + \alpha_c *Y_c +$$
$$\alpha_k *Y_k + \alpha_b *Y_b + \alpha_g *Y_g + \alpha_r *Yr$$
$$Z = \alpha_p *Z_p + \alpha_y *Z_y + \alpha_m *Z_m + \alpha_c *Z_c +$$
$$\alpha_k *Z_k + \alpha_b *Z_b + \alpha_g *Z_g + \alpha_r *Zr$$

with the relative area parts $$\alpha_p = (1-y)*(1-m)*(1-c)$$

$$\alpha_y = (y)*(1-m)*(1-c)$$

$$\alpha_m = (1-y)*(m)*(1-c)$$

$$\alpha_c = (1-y)*(1-m)*(c)$$

$$\alpha_r = (y)*(m)*(-c)$$

$$\alpha_g = (y)*(1-m)*(c)$$

$$\alpha_b = (1-y)*(m)*(c)$$

$$\alpha_k = (y)*(m)*(c)$$

and the area coverages of the primary colors y=relative area coverage yellow m=relative area coverage magenta c=relative area coverage cyan The indices stand for the colors p=paper white k=yellow +cyan+magenta y=yellow b=cyan +magenta m=magenta g=yellow +cyan c=cyan r=yellow +magenta The standardized color values $X_p$, $X_y$ ... $Y_p$, $Y_y$ etc. are the standardized color values of the printing colors and of the "paper white" of the printing material given full area coverage.

By multiplying out and read combing the above equations, new equations derive that supply a presentation in a coordinate system with the standardized color values $X_p$, $Y_p$ and $Z_p$ of the "paper white" as the origin.

The standardized color values X, Y and Z of printing colors in superimposed printing on the printing material referred to as the "paper white" derive as follows according to the new equations:

$$(X_p - X) = y * (X_p - X_y) + m * (X_p - X_m) + c * (X_p - X_c) +$$
$$y * m * [(X_p - X_r) - (X_p - X_y) - (X_p - X_m)] +$$
$$y * c * [(X_p - X_g) - (X_p - X_y) - (X_p - X_c)] +$$
$$m * c * [(X_p X_b) - (X_p - X_m) - (X_p - X_c)] +$$
$$y * m * c * [(X_p - X_k) + (X_p - X_y) + (X_p - X_m) +$$
$$(X_p - X_c) - (X_p - X_r) - (X_p - X_g) - (X_p X_b)]$$

$$(Y_p - Y) = y * (Y_p - Y_y) + m * (Y_p - Y_m) + c * (Y_p - Y_c) +$$
$$y * m * [(Y_p - Y_r) - (Y_p - Y_y) - (Y_p - Y_m)] +$$
$$y * c * [(Y_p - Y_g) - (Y_p - Y_y) - (Y_p - Y_c)] +$$
$$m * c * [(Y_pY_b) - (Y_p - Y_m) - (Y_p - Y_c)] +$$
$$y * m * c * [(Y_p - Y_k) + (Y_p - Y_y) + (Y_p - Y_m) +$$
$$(Y_p - Y_c) - (Y_p - Y_r) - (Y_p - Y_g) - (Y_pY_b)]$$

$$(Z_p - Z) = y * (Z_p - Z_y) + m * (Z_p - Z_m) + c * (Z_p - Z_c) +$$
$$y * m * [(Z_p - Z_r) - (Z_p - Z_y) - (Z_p - Z_m)] +$$
$$y * c * [(Z_p - Z_g) - (Z_p - Z_y) - (Z_p - Z_c)] +$$
$$m * c * [(Z_pZ_b) - (Z_p - Z_m) - (Z_p - Z_c)] +$$
$$y * m * c * [(Z_p - Z_k) + (Z_p - Z_y) + (Z_p - Z_m) +$$
$$(Z_p - Z_c) - (Z_p - Z_r) - (Z_p - Z_g) - (Z_pZ_b)]$$

Since a direct calculation of the area coverage value c, m and y is not possible from the new equations, the area coverage value c, m and y can only be calculated according to an iterative method.

An advantageous approximation solution for calculating the area coverage value c, m and y derives, leaving the values for the superimposed printing out of consideration, according to the equations:

$$(X_p-X)=y'*(X_p-X_y)+m'*(X_p-X_m)+c'*(X_p-X_c)$$

$$(Y_p-Y)=y'*(Y_p-Y_y)+m'*(Y_p-Y_m)+c'*(Y_p-Y_c)$$

$$(Z_p-Z)=y'*(Z_p-Z_y)+m'*(Z_p-Z_m)+c'*(Z_p-Z_c)$$

or, respectively, in matrix notation $$\begin{bmatrix} X_p - X \\ Y_p - Y \\ Z_p - Z \end{bmatrix} = \begin{bmatrix} X_p - X_y & X_p - X_m & X_p - X_c \\ Y_p - Y_y & Y_p - Y_m & Y_p - Y_c \\ Z_p - Z_y & Z_p - Z_m & Z_p - Z_c \end{bmatrix} * \begin{bmatrix} y' \\ m' \\ c' \end{bmatrix}$$

as $$\begin{bmatrix} y' \\ m' \\ c' \end{bmatrix} = \begin{bmatrix} X_p - X_y & X_p - X_m & X_p - X_c \\ Y_p - Y_y & Y_p - Y_m & Y_p - Y_c \\ Z_p - Z_y & Z_p - Z_m & Z_p - Z_c \end{bmatrix}^{-1} * \begin{bmatrix} X_p - X \\ Y_p - Y \\ Z_p - Z \end{bmatrix}$$

by matrix inversion.

This approximation is valid as long as the prods of the area coverage y*m, y*c, m*c and y*m*c is small compared to the individual values y, m and c. The approximation solution can be used as a start for an iterative calculation.

Introduction of the approximation values into the Neugebauer equations supplies $$(X_p-X')=y'*(X_p-X_y)+m'*(X_p-X_m)+ \ldots$$

$$(Y_p-Y')=y'*(Y_p-Y_y)+m'*(Y_p-Y_m)+ \ldots$$

$$(Z_p-Z')=y'*(Z_p-Z_y)+m'*(Z_p-Z_m)+ \ldots$$

The error of the approximation solution amounts to $$dX=(X_p-X)-(X_p-X')$$

$$dY=(Y_p-Y)-(Y_p-Y')$$

$$dZ=(Z_p-Z)-(Z_p-Z')$$

A series expansion in the following form is implemented for the calculation of correction values dy, dm and dc:

$$dX = dy * \frac{\delta(Xp-X)}{\delta y} + dm * \frac{\delta(Xp-X)}{\delta m} + dc * \frac{\delta(Xp-X)}{\delta c}$$

$$dY = dy * \frac{\delta(Yp-Y)}{\delta y} + dm * \frac{\delta(Yp-Y)}{\delta m} + dc * \frac{\delta(Yp-Y)}{\delta c}$$

$$dZ = dy * \frac{\delta(Zp-Z)}{\delta y} + dm * \frac{\delta(Zp-Z)}{\delta m} + dc * \frac{\delta(Zp-Z)}{\delta c}$$

Following in matrix notation for the correction values dy, dm and dc $$\begin{Vmatrix} dy \\ dm \\ dc \end{Vmatrix} \begin{Vmatrix} \delta X/\delta y & \delta X/\delta m & \delta X/\delta c \\ \delta Y/\delta y & \delta Y/\delta m & \delta Y/\delta c \\ \delta Z/\delta y & \delta Z/\delta m & \delta Z/\delta c \end{Vmatrix}^{-1} * \begin{Vmatrix} dX \\ dY \\ dZ \end{Vmatrix}$$

with the partial derivations:

$$\delta X/\delta y = \frac{\delta(Xp-X)}{\delta y} = (Xp - Xy) + m' * [(Xp - Xr) + \ldots$$

$$\delta X/\delta m = \frac{\delta(Xp-X)}{\delta m} = (Xp - Xm) + y' * [(Xp - Xr) + \ldots$$

$$\delta X/\delta c = \frac{\delta(Xp-X)}{\delta c} = (Xp - Xc) + y' * [(Xp - Xr) + \ldots$$

Equivalent relationships are valid for the partial derivations of y and z.

The calculated correction values dy, dm and dc are added to the approximation values $$y''=y'+dy$$

$$m''=m'+dm$$

$$c''=c'+dc$$

and form the starting values for a further iteration cycle. The iteration is broken off when the correction value vector reaches a lower barrier. The area coverage values y, m, c are calculated for all L*, a*, b* of the supporting points of the color space transformation filling.

In another method step [D], the calculation of the corresponding area coverage values k occurs for the color separation "black" (black separation) from the area coverage values c, m and y calculated in method step [C], ensuing according to the equation:

$$k=f(c,m,y)$$

The additional printing of the color "black" (skeleton black) services the purpose of enhancing the image contrast in the deep hues and of stabilizing the gray scale values in the moderate and deep hue range.

In standard printing processes, the color "black" is printed in addition to the other colors (skeleton black). However, it is also possible to replace a part of the tertiary with "black". The technical designation for this is gray component replacement (GCR).

The area coverage values k for the color separation "black" can be determined, for example, from the minimum of the area coverage values c, m and y of the three chromatic color separations, being identified according to the following equation:

$$k=a*\min(c'', m'', Y'')>a \leq 1.0$$

The minimum value can be converted via a gradation characteristic into the area coverage values k.

As a result of adding the "skeleton black" or by the replacement of the "three-color-gray" with "black", the color in the printing is usually falsified. The area coverage values c, m and y must therefore be corrected in a further method step.

In a further method step [E], the area coverage values c, m and y calculated in method step [C] are then corrected into the new area coverage values c, m and y with the corresponding Neugebauer equations for four-color printing upon prescription of the area coverage values k respectively calculated in method step [D], being corrected according to the following method equivalent to [C]: valid in four-color printing for the color values of printing colors in superimposed printing on paper as printing material:

$$(X, Y, Z) = \sum_i \alpha_i * (X_i, Y_i, Z_i)$$

with

| i | $\alpha_i$ | $X_i, Y_i, Z_i$ |
|---|---|---|
| 0 | $(1-y)*(1-m)*(1-c)*(1-k)$ | paper white |
| 1 | $(y)*(1-m)*(1-c)*(1-k)$ | yellow |
| 2 | $(1-y)*(m)*(1-c)*(1-k)$ | magenta |
| 3 | $(1-y)*(1-m)*(c)*(1-k)$ | cyan |
| 4 | $(y)*(m)*(1-c)*(1-k)$ | yellow + magenta |
| 5 | $(y)*(1-m)*(c)*(1-k)$ | yellow + cyan |
| 6 | $(1-y)*(m)*(c)*(1-k)$ | magenta + cyan |
| 7 | $(y)*(m)*(c)*(1-k)$ | G + M + C |
| 8 | $(1-y)*(1-m)*(1-c)*(k)$ | black (S) |
| 9 | $(y)*(1-m)*(1-c)*(k)$ | black + yellow |
| 10 | $(1-y)*(m)*(1-c)*(k)$ | black + magenta |
| 11 | $(1-y)*(1-m)*(c)*(k)$ | black + cyan |
| 12 | $(y)*(m)*(1-c)*(k)$ | black + G + M |
| 13 | $(y)*(1-m)*(c)*(k)$ | black + G + C |
| 14 | $(1-y)*(m)*(c)*(k)$ | black + M + C |
| 15 | $(y)*(m)*(c)*(k)$ | S + G + M + C | and the relative area coverage values of the primary colors
y=relative area coverage value yellow
m=relative area coverage value magenta
c=relative area coverage value cyan
k=relative area coverage value black Multiplying out and recombination supplies a presentation of the Neugebauer equations in a coordinate system with the paper white $X_0, Y_0, Z_0$ as origin:

$$\begin{bmatrix} X_0 - X \\ Y_0 - Y \\ Z_0 - Z \end{bmatrix} = \sum_i \beta_i * \begin{bmatrix} f(X_0 - X_i) \\ f(Y_0 - Y_i) \\ f(Z_0 - Z_i) \end{bmatrix}$$

with

| i | $\beta_i$ | $f(X_0 - X_i)$, Corresponding to Y and Z |
|---|---|---|
| 1 | y | $(X_0 - X_1)$ |
| 2 | m | $(X_0 - X_2)$ |
| 3 | c | $(X_0 - X_3)$ |
| 4 | y*m | $(X_0 - X_4) - (X_0 - X_1) - (X_0 - X_2)$ |
| 5 | y*c | $(X_0 - X_5) - (X_0 - X_1) - (X_0 - X_3)$ |
| 6 | m*c | $(X_0 - X_6) - (X_0 - X_2) - (X_0 - X_3)$ |
| 7 | y*m*c | $(X_0 - X_7) - (X_0 - X_4) - (X_0 - X_5) - (X_0 - X_6) +$ $(X_0 - X_1) - (X_0 - X_2) - (H_0 - X_3)$ |

1-continued $$\begin{bmatrix} X_0 - X \\ Y_0 - Y \\ Z_0 - Z \end{bmatrix} = \sum_i \beta_i * \begin{bmatrix} f(X_0 - X_i) \\ f(Y_0 - Y_i) \\ f(Z_0 - Z_i) \end{bmatrix}$$

with

| i | $\beta_i$ | $f(X_0 - X_i)$, Corresponding to Y and Z |
|---|---|---|
| 8 | k | $(X_0 - X_8)$ |
| 9 | y*k | $(X_0 - X_9) - (X_0 - X_1) - (X_0 - X_8)$ |
| 10 | m*k | $(X_0 - X_8) - (X_0 - X_2) - (X_0 - X_8)$ |
| 11 | c*k | $(X_0 - X_{11}) - (X_0 - X_3) - (X_0 - X_8)$ |
| 12 | y*m*k | $(X_0 - X_{12}) - (X_0 - X_4) - (X_0 - X_9) - (X_0 - X1_0) + (X_0 - X_1) - (X_0 - X_2) - (X_0 - X_8)$ |
| 13 | y*c*k | $(X_0 - X_{13}) - (X_0 - X_5) - (X_0 - X_9) - (X_0 - X_{11}) + (X_0 - X_1) - (X_0 - X_3) - (X_0 - XX_8)$ |
| 14 | m*c*k | $(X_0 - X_{14}) - (X_0 - X_6) - (X_0 - X_{10}) - (X_0 - X_{11}) + (X_0 - X_2) - (X_0 - X_3) - (X_0 - X_8)$ |
| 15 | y*m*c*k | $(X_0 - X_{15}) - (X_0 - X_7) - (X_0 - X_{12}) - (X_0 - X_{13}) - (X_0 - X_{14}) - (X_0 - X_1) - (X_0 - X_2) - (X_0 - X_3) - (X_0 - X_8) + (X_0 - X_4) - (X_0 - X_5) - (X_0 - X_6) + (X_0 - X_9) - (X_0 - X_{10}) - (X_0 - X_{11})$ | and the standardized color values $X_i$, $Y_i$, $Z_i$, of the printing colors and their superimposed printing.

As in method step [C], an approximation solution occurs for the area average values:

$$(X_0-X)=y'^*(X_0-X_1)*m'^*(X_0-X_2)+c'^*(X_0-X_3)$$

$$(Y_0-Y)=y'^*(Y_0-Y_1)*m'^*(Y_0-Y_2)+c'^*(Y_0-Y_3)$$

$$(Z_0-Z)=y'^*(Z_0-Z_1)*m'^*(Z_0-Z_2)+c'^*(Z_0-Z_3)$$

or, respectively, in matrix notation $$\begin{bmatrix} (X_0 - X) \\ (Y_0 - Y) \\ (Z_0 - Z) \end{bmatrix} = \begin{bmatrix} (X_0 - X_1) & (X_0 - X_2) & (X_0 - X_3) \\ (Y_0 - Y_1) & (Y_0 - Y_2) & (Y_0 - Y_3) \\ (Z_0 - Z_1) & (Z_0 - Z_2) & (Z_0 - Z_3) \end{bmatrix} * \begin{bmatrix} y' \\ m' \\ c' \end{bmatrix}$$

by matrix inversion $$\begin{bmatrix} y' \\ n' \\ c' \end{bmatrix} = \begin{bmatrix} (X_0 - X_1) & (X_0 - X_2) & (X_0 - X_3) \\ (Y_0 - Y_1) & (Y_0 - Y_2) & (Y_0 - Y_3) \\ (Z_0 - Z_1) & (Z_0 - Z_2) & (Z_0 - Z_3) \end{bmatrix}^{-1} * \begin{bmatrix} X_0 - X \\ Y_0 - Y \\ Z_0 - Z \end{bmatrix}$$

This approximation is valid as long as the products of the area coverage values y*m, y*c, m*c, ... are small compared to the individual values y, m and c.

The approximation solution can in turn be utilized as a start for an iterative calculation.

Introducing the approximation values into the Neugebauer equations supplies:

$$(X_0-X')=y'^*(X_0-X_1)+m'^*(X_0-X_2)+ \ldots$$

$$(Y_0-Y')=y'^*(Y_0-Y_1)+m'^*(Y_0-Y_2)+ \ldots$$

$$(Z_0-Z')=y'^*(Z_0-Z_1)+m'^*(Z_0-Z_2)+ \ldots$$

The error of the approximation solution amounts to:

$$dX=(X_0-X)-(X_0-X')$$

$$dY=(Y_0-Y)-(Y_0-Y')$$

$$dZ=(Z_0-Z)-(Z_0-Z')$$

a series expansion is again implemented for calculating correction values dy, dm and dc $$dX = dy * \frac{\delta(X_0 - X)}{\delta y} + dm * \frac{\delta(X_0 - X)}{\delta m} + dc * \frac{\delta(X_0 - X)}{\delta c}$$

$$dY = dy * \frac{\delta(Y_0 - Y)}{\delta y} + dm * \frac{\delta(Y_0 - Y)}{\delta m} + dc * \frac{\delta(Y_0 - Y)}{\delta c}$$

$$dZ = dy * \frac{\delta(Z_0 - Z)}{\delta y} + dm * \frac{\delta(Z_0 - Z)}{\delta m} + dc * \frac{\delta(Z_0 - Z)}{\delta c}$$

in matrix notation $$\begin{vmatrix} dy \\ dm \\ dc \end{vmatrix} = \begin{vmatrix} \delta X/\delta y & \delta X/\delta m & \delta X/\delta c \\ \delta Y/\delta y & \delta Y/\delta m & \delta Y/\delta c \\ \delta Z/\delta y & \delta Z/\delta m & \delta Z/\delta c \end{vmatrix}^{-1} * \begin{vmatrix} dX \\ dY \\ dZ \end{vmatrix}$$

follows for the correction values dy, dm and dc with the parallel derivations:

$$\delta X/\delta y = \frac{\delta(X_0 - X)}{\delta y} = (X_0 - X_1) + m' * [(X_0 - X_2) + \ldots$$

$$\delta X/\delta m = \frac{\delta(X_0 - X)}{\delta m} = (X_0 - X_2) + y' * [(X_0 - X_4) + \ldots$$

$$\delta X/\delta c = \frac{\delta(X_0 - X)}{\delta c} = (X_0 - X_3) + y' * [(X_0 - X_4) + \ldots$$

The equivalent relationships are valid for the partial derivations of y and z.

The calculated correction value dy, dm and dc are added to the approximation values.

$$y''=y'+dy$$

$$m''=m'+dm$$

$$c''=c'+dc$$

and form the starting values for a further iteration cycle. The iteration is broken off when the correction value vector has reached a lower barrier. The area coverage values y, m, c are calculated for all color values L*, a*, b* of the supporting points of the color space transformation filling, whereby the functional relationship to black k is prescribed.

After the correction of the area correction values c, m and y, a check is also advantageously carried out to see whether the sum of the area coverage value c, m, y and k is greater than a prescribable limit value. When this is the case, the area coverage values k are incremented in small steps, this only being possible when the area coverage value c, m and y are greater than 0, and a recalculation according to method step [E] is then undertaken Otherwise, a switch is made to method step [F].

In a further method step [F], finally, the effective area coverage values C, m, y and k, which are a criterion for the size of the raster dots (printing dots) of the printing colors on the printing material, that were calculated in method steps [D] and [E] are converted—for the purpose of an adaptation to printing process—into the color separation values C, M, Y and K required for the exposure of the color separations with a color separation exposure, these being a criterion for the raster densities to be achieved on the color separation films.

The optical appearance of the raster dots is larger than the actual size of the raster dot in the printed format. This effect is referred to as dot growth. The dot growth results therefrom that an optical enlargement is produced by light capture at the boundaries of the raster dot, this being dependent on the shape and size of the raster dots. The transfer characteristic for the dot growth in printing can be approximately analytically described accoding to the following equation:

Dot Growth in Printing $$Fd = \frac{1 - L^{Fv/100}}{1 - L} * 100 \text{ with } L = \left[\frac{50 - F50}{50 + F50}\right]^2$$

and $F_d$=Area coverage value in the print in percentage
$F_v$=Area coverage value of the color separation film in percent
$F_{50}$=Dot growth given 50% raster dot of the color separation film in percent An inverse dot growth correction can be determined from the above equation, in accordance wherewith the effective area coverage values c, m, y and k for the printing are corrected into the color separation values C, M, Y and K for the exposure of the color separations on a film material. The inverse equation reads:
Dot Growth Correction on Film $$Fv = \frac{1n(1 - Fd * (1 - L)/100)}{1n(L)}$$

The above-described method steps are repeated for every supporting point (i, j, k) of the supporting point framework in the CIELAB color space. The color separation values C, Y, M, K and K approximately calculated for every supporting point dependent on the corresponding color values L*, a*, b* are loaded as a print table into the LUT of the output color converter (12) of the color image processing system according to FIG. 1 via the input (13).

The color value calibration of the approximately calculated printing table then occurs.

Color Value Calibration of the Approximately Calculated Printing Table

Figure 3:
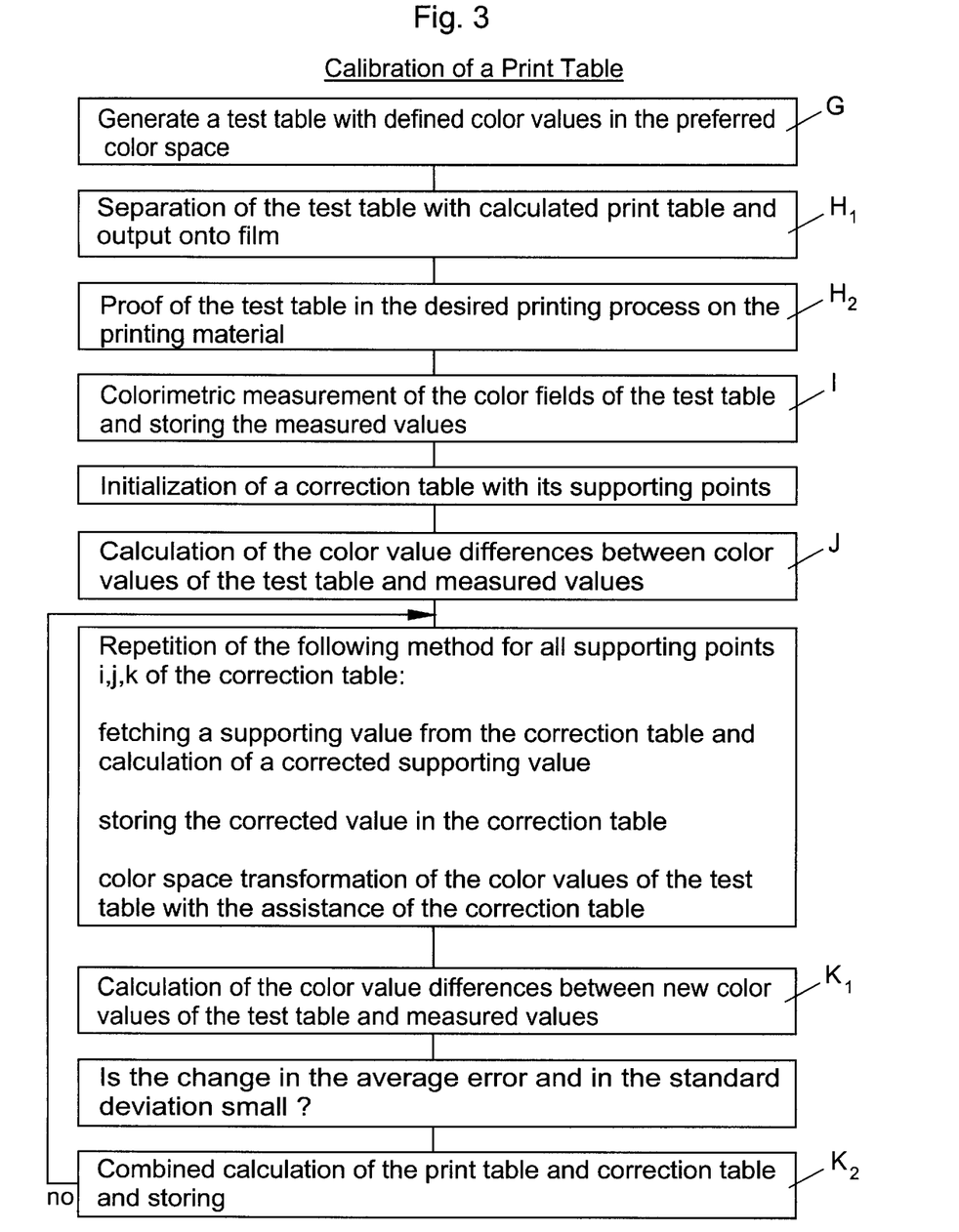
FIG. 3 is a flowchart for color value calibration.
Figure 4:
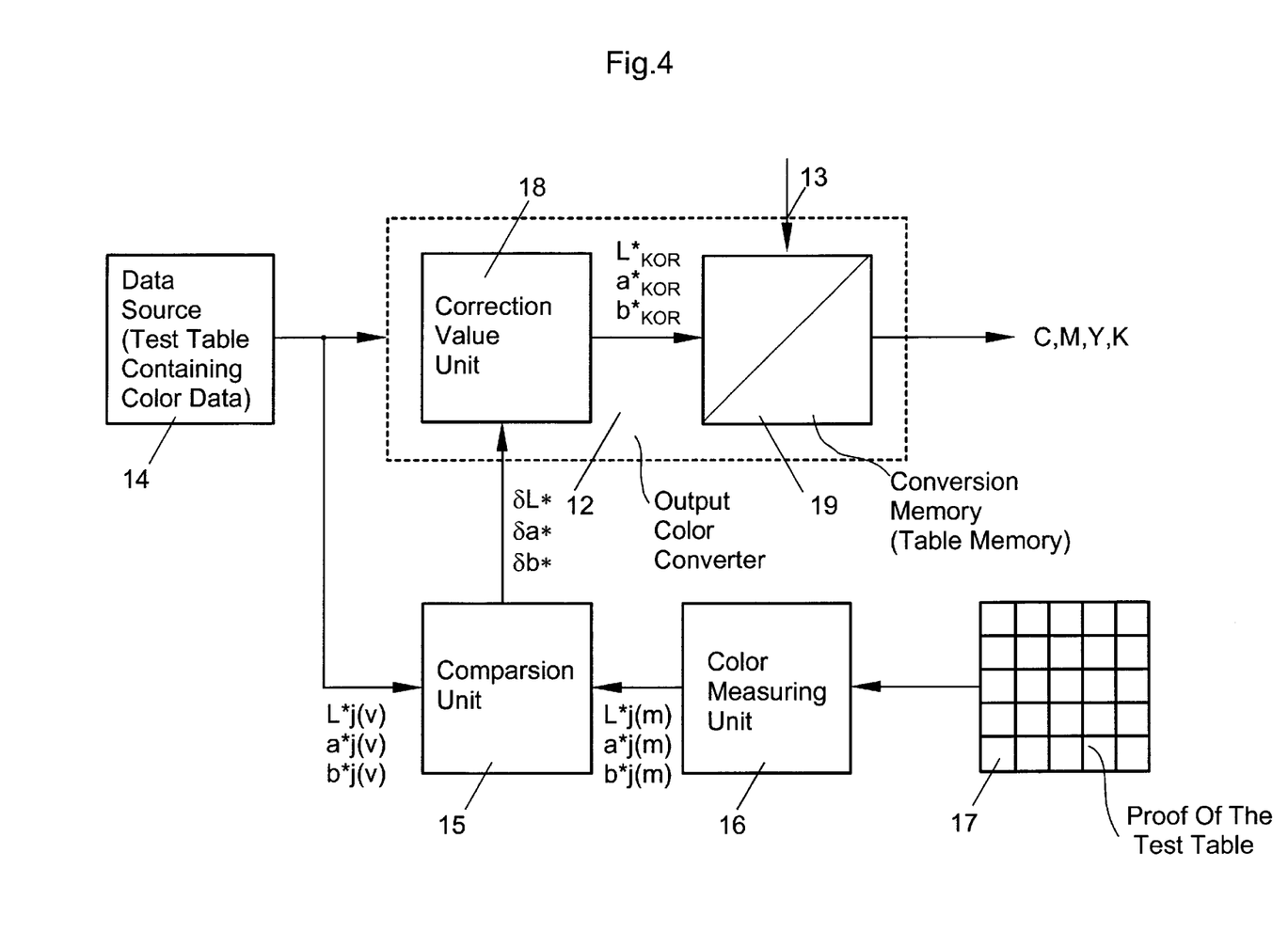
FIG. 4 is a block circuit diagram of a means for determining correction values for the color value calibration.

FIG. 3 shows a flowchart of the color value calibration and FIG. 4 shows a block circuit diagram of an apparatus for calculating correction values for the color value calibration.

The apparatus of FIG. 4 is composed of a data source (14) for storing the color data of a test table, of the output color converter (12) according to FIG. 1, of a comparison unit (15) for calculating correction values, and of a color measuring means (16) for the colorimetric measurement of a proof (17) of a test table. The output color converter (12) comprises a correction value unit (18) for calculating correct color values and comprises a conversion memory (19) for storing the approximately calculated printing table C, M, Y, K=f(L*, a*, b*).

The following method steps [G] through [K] sequence in the color value calibration:

In a method step [G], a test table having a plurality (j) of color fields is first generated whose color values are defined in a standardized communication color space, for example as color values L*, a* and b* of the CIELAB color space. A member and distribution of the color fields determine the quality of the color value calibration. The color fields should be equidistantly distributed in the printing color space. For example, an arrangement equivalent to the color table of Kodak (Q-60A or C) can be employed as the test table.

The color values L*j(v), a*j(v) and b*j(v) of the individual color fields (j) of the test table can already be present as digitized color data or can be acquired by optoelectronic scanning of the test table in a calibrated color scanner. The color values L*j(v), a*j(v) and b*j(v) that represent rated values for the printing process are deposited in the data source (14) of the apparatus.

In a following method step [H], the printing forms of the test table are exposed and the test table is subsequently printed with a proof copy machine with the printing process provided for the later useful printing and on the printing material that is to be provided, or is produced as a proof with a suitable proof method.

The manufacture of the printing forms occurs, for example, with a color separation recorder. The color data L*j(v), a*j(v) and b*j(v) of the test table are first converted into the color separation values C, M, Y and K with the printing table C, M, Y, K=f(L*, a*, b*) deposited in the conversion memory (19) of the color converter (12), whereby the correction value memory (18) is deactivated. The color separations are then exposed point-by-point and line-by-line on film with the color separation values C, M, Y and K.

In a further method step [I], the color values L*j(m), a*j(m) and b*j(m) of the color fields of the proof (17) are colorimetrically measured with a suitable color measuring unit (16), for example with a spectral photometer as actual values. If the spectral photometer measures only the standardized color values Xj(m), Yj(m) and Zj(m) of the color fields, they must be transformed into the color values L*j(m), a*j(m) and b*j(m). A prerequisite for the exact identification of the color values L*j(m), a*j(m) and b*j(m) is that the reference white of the color table and of the proof are the same. Otherwise, a chromatic adaptation transformation is required.

In a further method step [J], the color values L*j(v), a*j(v) and b*j(v) of the color fields of the test table are compared to the measured color values L*j(m), a*j(m) and b*j(m) of the corresponding color fields of the proof (17) in a comparator (15) and color difference values L*j(m)−L*j(v), a*j(m)−a*j(v) and b*j(m)−b*j(v) are determined from the comparison.

In a further method step [K], correction color values dL*, da* and db* in the form of a correction value table are then calculated from the color difference values L*j(m)−L*j(v), a*j(m)−a*j(v) and b*j(m)−b*j(v), and the corrected color values L*$_{KOR}$, a*$_{KOR}$ and b*$_{KOR}$ are determined by a weighted addition of correction color values dL*, da* and db* and the color values L*j(v), a*j(v) and b*j(v) according to the following equations:

$$L*_{KOR}=L*j(v)+dL*$$

$$a*_{KOR}=a*j(v)+da*$$

$$b*_{KOR}=b*j(v)+db*$$

Two approaches can be taken for calculating the corrected color values L*$_{KOR}$, a*$_{KOR}$ and b*$KOR$. First, the correction color values dL*, da* and db* can be stored and can then be constantly added to the color values L*, a* and b* of the printing table in the correction value unit (18) during the actual color transformation. Second, the addition of the correction color values dL*, da* and db* and of the color values L*, a* and b* can occur before the actual color transformation for forming the corrected color values L*$_{KOR}$, a*$_{KOR}$ and b*$_{KOR}$. The corrected color values L*$_{KOR}$, a*$_{KOR}$ and b*$_{KOR}$ are then stored in the correction value unit (18) and are read out from the correction value unit (18) during the color transformation and are further-processed.

In an expedient way, the color values L*j(v), a*j(v) and b*j(v) of the printing table and the corresponding correction color values dL*, da* and db* are calculated only for a framework of supporting values of the theoretically possible color space and the corrected color values $L^*_{KOR}$, $a^*_{KOR}$ and $b^*_{KOR}$ required in the later, ongoing color conversion are calculated by interpolation in the supporting framework.

Given a framework of supporting points having, for example, 32×32×32 =32768 supporting points for the color values, it is expedient to implement the color value calibration according to a compensation method with a smaller member of color values.

The calculation of the correction color values dL*, da* and db* according to the compensation method advantageously occurs with a calorimetric distance evaluation on the basis of a weighting or spacing function f(j) according to the following equations:

$$dL^* = \Sigma j[f(j) \times (L^*j(m) - L^*j(v))]/\Sigma j [f(j)]$$

$$da^* = \Sigma j[f(j) \times (a^*j(m) - a^*j(v))]/\Sigma j [f(j)]$$

$$db^* = \Sigma j[f(j) \times (b^*j(m) - b^*j(v))]/\Sigma j [f(j)]$$

whereby dL*, da*, db*=correction color values $L^*j(v)$, $a^*j(v)$, $b^*j(v)$=measured values of the test table $L^*j(m)$, $a^*j(m)$, $b^*j(m)$=measured values of the proof f(j)=distance function j=running index The summation j thereby runs over all color fields of the test table.

Expediently, for example, the distance function f(j) is an inverse function of the fourth order accoding to the following equation:

$$f(j) = 1/[(L^* - L^*j(m))2 + (a^* - a^*j(m))^2 + (b^*j(m))^2]^2$$

The distance function f(i) takes color fields of the test table in the proximity of the current supporting point into greater consideration than color fields at a greater distance. The selection of the distance function defines the quality and the convergence of the method.

The method has thus been ended and the output color transformation has been calculated. When it turns out that the error in a specific application is too great, the method can be repeated with this new, approximated printing table until the desired deviation has been achieved or, respectively, fallen below.

Figure 5:
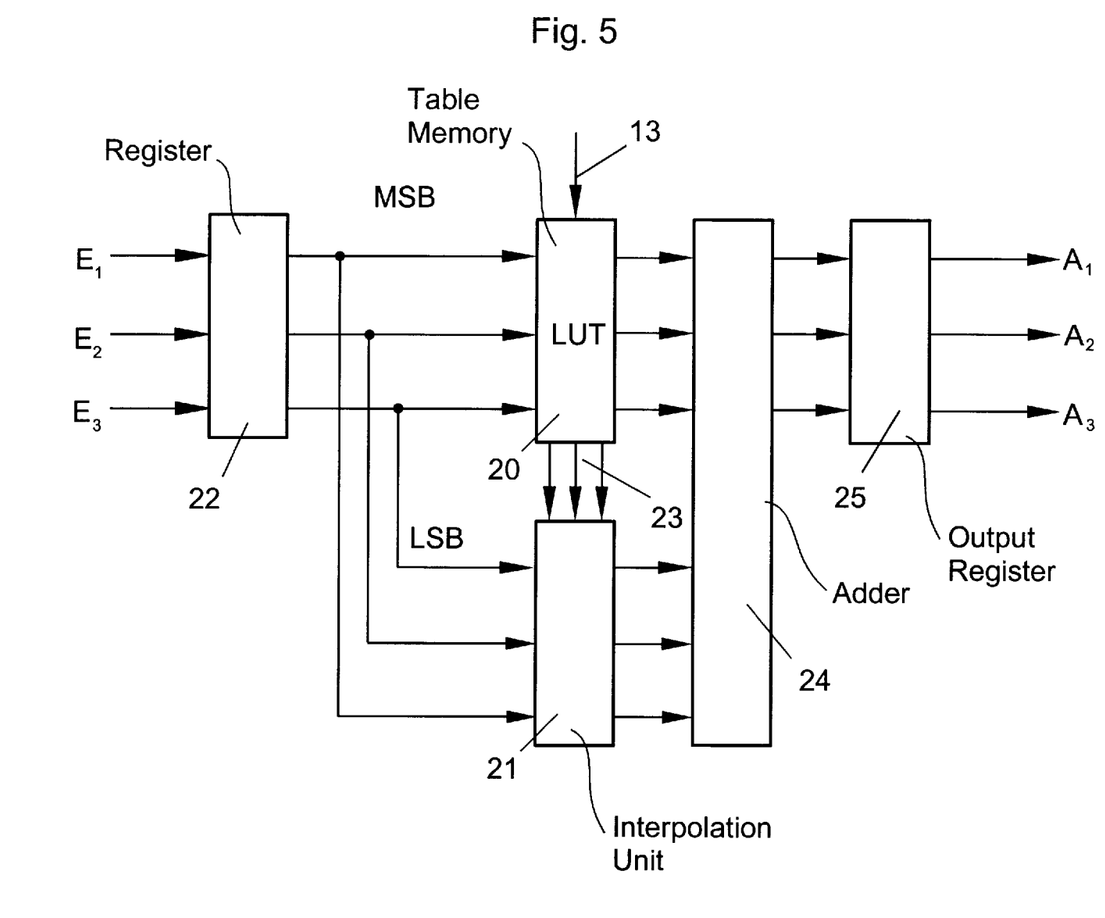
FIG. 5 illustrates a color converter in a block circuit diagram.

FIG. 5 shows the fundamental structure of the three-dimensional output color converter (12) with a three dimensional table memory (20), also referred to as look-up table (LUT), and with an interpolation unit (21) for the case wherein the printing table is first calculated only for a framework of supporting points of roughly graduated color values and the output color values actually required during operation are calculated by a three-dimensional interpolation calculation. The previously calculated, roughly graduated printing table was deposited in the table memory (20) via the input (13) of the output color converter (12). The input color values E1, E2 and E3 of the output converter (12), for example the color values L*, a* and b*, are first intermediately stored in a register (22) and, for further operations, are resolved, for example, into five most significant bits (MSB) and three least significant bits (LSB), whereby the most significant bits are supplied to the table memory (20) as addresses and the least significant bits are supplied to the interpolation unit (21) an operand. In the interpolation unit (21), interpolation values are then calculated from the least significant bits and from the corresponding supporting points that are supplied to the interpolation unit (21) via a line (23). The interpolation values are linked with the supporting values in an adder (24) to form the output color values A1, A2 and A3 of the output color converter (12), for example to form the color separation values C, M and Y, and are deposited in an output register (25).

Although various minor changes and modifications might be proposed by those skilled in the art, it will be understood that my wish is to include within the claims of the patent warranted hereon all such changes and modifications as reasonably come within my contribution to the art.

I claim as my invention:

1. A method for conversion of color values of a first color space into color values of a second color space as a printing color space characteristic of a printing process in apparatus and systems for color image processing, comprising the steps of:

approximately analytically calculating corresponding color separation values of the printing color space for the respective printing process from color values of the first color space and forming an approximated printing table, taking printing colors of the printing color space for the printing process employed, colorimetric properties of a printing material used in the printing process, and printing process parameters into consideration;

by use of the approximated printing table, calculating corresponding color separation values from characteristic color values of a color test table of a data source;

producing a proof of the color test table with said calculated corresponding color separation values and colorimetrically measuring the proof, taking the printing process parameters for the later printing process into consideration;

calculating color difference values as correction color values by determining differences between actual color values acquired by said colorimetric measurement of said proof and said characteristic color values of said color test table as rated color values;

creating corrected color values by combining said difference color values as correction color values with said characteristic color values of the color test table; and inputting said corrected color values to said approximated printing table so that table values of the printing table are corrected and the printing table can then be used for a substantially more exact conversion of the color values of the first color space into the color separation values of the second color space for the respective printing process.

2. The method according to claim 1 wherein the first color space is L, a, b and the second color space is C, M, Y, K.

3. The method according to claim 1 wherein the first color space is an equidistantly graduated color space.

4. The method according to claim 3 wherein the equidistantly graduated color space conforms to sensation.

5. The method according to claim 3 wherein the equidistantly graduated color space is a CIELAB color space.

6. The method according to claim 2 wherein for the approximate analytical calculation of the printing table [C, M, Y, K=f(L*, a*, b*)], the color values [L*, a*, b*] of the first color space are transformed into the standardized color values [X, Y, Z] of a CIE 1931 XYZ color space, taking a type of light into consideration;

the standardized color values [X, Y, Z] are chromatically adapted to the reference white of the respective printing material based on a chromatic adaptation transformation;

the effective area coverage values [c, m, y] are calculated from the chromatically adapted standardized color values [X', Y', Z'] with assistance of Neugebauer equations for three-color printing, said area coverage values being a criterion for raster dot sizes of the three printing colors on the printing material;

the functionally corresponding area coverage values [k] for a printing color "black" are calculated from the effective area coverage values [c, m, y] of the three chromatic printing colors;

corrected, effective area coverage values [c", m", y"] are calculated from the effective area coverage values [c, m, y] of the three chromatic printing colors with assistance of Neugebauer equations for four-color printing upon prescription of the area coverage values [k] of the printing color "black"; and the corrected, effective area coverage values [c", m", y"] as well as the value [k] are converted into the color separation values [C, M, Y, K] of the printing table, taking dot growth during printing into consideration.

7. The method according to claim 6 wherein the chromatic adaptation transformation of the standardized color values [X, Y, Z] is implemented according to a "von Kries" transformation.

8. The method according to claim 6 wherein the area coverage values [k] for the printing color "black" are calculated from a respective minimum value of the effective area coverage values [c", m", y"] of the three chromatic printing colors.

9. The method according to claim 6 wherein the calculation and correction of the effective area coverage values is implemented with the assistance of the Neugebauer equations for three-color printing and four-color printing, being iteratively implemented according to an approximation method leaving the color values that arose due to the superimposed printing of raster dots out of consideration;

the error of the approximation solution is corrected with a correction value acquired by a series expansion; and the iteration is broken off as soon as the correction value has reached a prescribable, lower limit value.

10. The method according to claim 8 wherein after the chromatic adaptation transformation, a check is carried out to see whether the chromatically adapted standardized color values [X', Y', Z'] lie in the respective printing color space; and if the chromatically adapted standardized color values [X', Y', Z'] do not lie in the printing color space, an image of the non-printable color values is implemented onto the surface of the printing color space upon preservation of the hue as well as with uniform reduction of luminance [L*] and hue [a*, b*].

11. The method according to claim 8 wherein after the correction of the effective area coverage values [c, m, y, k], a check is carried out to see whether the sum of the area coverage values is greater than a prescribable limit value; and if this is the case, the area coverage values [k] are incremented in small steps and a recalculation of the area coverage values is undertaken according to the Neugebauer equations for four-color printing.

12. The method according to claim 2 wherein for the correction of the approximately calculated printing table [C, M, Y, K=f(L*, a*, b*)], said color test table is provided with a plurality of colors [j] and the color values [L*j (v), a*j (v), b*j (v)] of color fields thereof are identified as said rated values;

the rated color values [L*j(v), a*j(v), b*j(v)] of the color test table are converted into the color separation values [C, M, Y, K] based on the approximately calculated printing table [C, M, Y, K=f(L*, a*, b*)];

the color test table is proof-printed on the later printing material with assistance of the color separation values [C, M, Y, K];

the actual color values [L*j(m), a*j(m), b*j(m)] of the corresponding colors of the color test table present as the proof are colorimetrically measured;

the rated color values [L*j (v), a*j (v), b*j (v)] and the corresponding actual color values [L*j(m), a*j(m), *j(m)] are compared to one another; and the corresponding correction color values [dL*, da*, db*] for the color values [L*, a*, b*] of the printing table [C, M, Y, K=f(L*, a*, b*)] are calculated according to a compensation method from the color difference values as correction color values acquired by comparison of the rated color values and the actual color values.

13. The method according to claim 2 wherein the correction color values [dL*, da*, db*] are calculated from the rated color values [L*j(v), a*j(v), b*j(v)] and the colorimetrically measured actual color values [L*j(m), a*j(m), b*j(m)] of the color test table with colorimetric distance evaluation based on a distance function [f(j)] according to the following equation:

$$dL^* = \Sigma j[f(j) \times (L^*j(m) - L^*j(v))]/\Sigma j \,[f(j)]$$

$$da^* = \Sigma j[f(j) \times (a^*j(m) - a^*j(v))]/\Sigma j \,[f(j)]$$

$$db^* = \Sigma j[f(j) \times (b^*j(m) - b^*j(v))]/\Sigma j \,[f(j)]$$

and the corrected color values [L*$_{KOR}$, a*$_{KOR}$, b*$_{KOR}$] are calculated from the color values [L*, a*, b*] and from the correction color values [dL*, da*, db*] by addition according to the following equation:

$$L^*_{KOR} = L^* + dL^*$$

$$a^*_{KOR} = a^* + da^*$$

$$b^*_{KOR} = b^* + db^*$$

whereby:

dL*, da*, db*=correction color values $L^*j(v), a^*j(v), b^*j(v)$=measured values of test table $L^*j(m), a^*j(m), b^*j(m)$=measured values of proof $f(j)$=distance function.

14. The method according to claim 12 wherein a function of a fourth order having a form $$f(j) = 1/[(L^* - L^*j(m))^2 + (a^* - a^*j(m))^2 + (b^* - b^*j(m))^2]^2$$

is employed as said distance function.

15. The method according to claim 1 wherein the color test table is a color table with colorimetrically defined color fields.

16. The method according to claim 15 wherein the colors of the color fields of the test table are selected visually equidistant in the color space.

17. The method according to claim 2 wherein actual color values [L*j(m), a*j(m), b*j(m)] of colors of the color test table, are measured with a spectral photometer.

18. The method according to claim 2 wherein actual color values [L*j(m), a*j(m), b*j(m)] of colors of the color test table are measured with a colorimeter.

19. The method according to claim 2 wherein actual color values [L*j(m), a*j(m), b*j(m)] of colors of the color test table are measured with a calibrated input device.

20. The method according to claim 2 wherein the correction color values [dL*, da*, db*] are stored and are added with proper operational sign to stored color values [L*j(v), a*j(v), b*j(v)] during ongoing color conversion in order to obtain the corrected color values [L*$_{KOR}$, a*$_{KOR}$, b*$_{KOR}$].

21. The method according to claim 2 wherein the correction color values [dL*, da*, db*] are added with proper operational sign to the stored color values [L*j(v), a*j(v), b*j(v)] before ongoing color conversion in order to obtain the corrected color values [L*$_{KOR}$, a*$_{KOR}$, b*$_{KOR}$].

22. The method according claim 2 wherein the corrected printing table [C, M, Y, K=f(L*, a*, b*)] is calculated on the basis of the corrected color values [L*$_{KOR}$, a*$_{KOR}$, b*$_{KOR}$].

23. The method according to claim 2 wherein the color values of the printing table [C, M, Y, K=f(L*, a*, b*)] are stored as a three-dimensional look-up table.

24. An apparatus for conversion of color values of a first color space into color separation values of a second color space as a printing color space in apparatus and systems for color image processing, comprising:

a data source for storing rated color values of colors of a color test table;

a table memory for depositing an approximately calculated printing table;

a measuring instrument for the colorimetric identification of actual color values of colors of a proof of the color test table;

a comparison unit whose inputs are connected to outputs of the data source and of the measuring instrument for comparing the rated color values of the colors of the color test table to the measured actual color values of the colors of the proof of the color test table; and a correction value unit whose inputs are connected to the outputs of the data source and of the comparison unit and whose output is connected to an input of the table memory for acquiring color correction values from color difference values acquired by comparison of the rated color values to the actual color values and for generating corrected color values for the color conversion.

25. An apparatus according to claim 24 wherein the table memory is corrected by the generated corrected color values input to the table memory.

26. An apparatus according to claim 24 wherein the first color space is L, a, b and the second color space is C, M, Y, K.

27. The apparatus according to claim 26 wherein the correction value unit comprises a second table memory for depositing the corrected color values [L*$_{KOR}$, a*$_{KOR}$, b*$_{KOR}$].

28. The apparatus according to claim 24 wherein the correction value unit comprises an interpolator.

29. The apparatus according to claim 24 wherein a calorimeter is employed as said measuring instrument.

30. The apparatus according to claim 24 wherein a spectrophotometer is employed as said measuring instrument.

31. The apparatus according to claim 24 wherein a calibrated input device is employed as said measuring instrument.

32. The apparatus according to claim 24 wherein a color scanner is employed as said measuring instrument.

33. A method for conversion of color values of a first color space into color values of a second color space as a printing color space characteristic of a printing process in apparatus and systems for color image processing, comprising the steps of:

approximately analytically calculating corresponding color separation values of the printing color space for the respective printing process from color values of the first color space and forming an approximated printing table;

by use of the approximated printing table, calculating corresponding color separation values from characteristic color values of a color test table of a data source;

producing a proof of the color test table with said calculated corresponding color separation values and colorimetrically measuring the proof;

calculating color difference values as correction color values by determining differences between actual color values acquired by said colorimetric measurement of said proof and said characteristic color values of said color test table as rated color values;

creating corrected color values by combining said difference color values as correction color values with said characteristic color values of the color test table; and inputting said corrected color values to said approximated printing table so that table values of the printing table are corrected and the printing table can then be used for a substantially more exact conversion of the color values of the first color space into the color separation values of the second color space for the respective printing process.

* * * * *